United States Patent
Spence

(10) Patent No.: US 10,800,533 B2
(45) Date of Patent: Oct. 13, 2020

(54) MODULAR ELECTRICAL SIGNAL SUPPLY ASSEMBLIES, VEHICLES, AND RELATED METHODS

(71) Applicant: The Boeing Company, Chicago, IL (US)

(72) Inventor: Andrew J. Spence, Seattle, WA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 15/726,242

(22) Filed: Oct. 5, 2017

(65) Prior Publication Data
US 2019/0106216 A1    Apr. 11, 2019

(51) Int. Cl.
*B64D 11/06*     (2006.01)
*B64D 11/00*     (2006.01)
*B64F 5/10*      (2017.01)

(52) U.S. Cl.
CPC ...... *B64D 11/0624* (2014.12); *B64D 11/0015* (2013.01); *B64F 5/10* (2017.01); *B64D 2011/0046* (2013.01)

(58) Field of Classification Search
CPC ..... B64D 11/00; B64D 11/0015; B64D 11/06; B64D 11/0696; B64D 11/0624; B64D 11/0648; B64D 11/0602; B64D 47/00; B64F 5/10; B64C 1/18
See application file for complete search history.

(56) References Cited

U.S. PATENT DOCUMENTS

| | | | | |
|---|---|---|---|---|
| 4,399,642 A | * | 8/1983 | Bard | ......................... B64C 1/18 52/483.1 |
| 5,010,211 A | * | 4/1991 | Bartee | .................... H02G 3/185 174/488 |
| 6,674,000 B2 | * | 1/2004 | Lambiaso | ............ H01R 13/518 174/135 |

(Continued)

OTHER PUBLICATIONS

JJS Manufacturing Blog, "6 Critical Factors to consider when potting an electronic assembly", Apr. 7, 2016 via archive.org; https://web.archive.org/web/20160407080504/https://blog.jjsmanufacturing.com/6-critical-factors-to-consider-when-potting-an-electronic-assembly (Year: 2016).*

(Continued)

*Primary Examiner* — Assres H Woldemaryam
(74) *Attorney, Agent, or Firm* — Dascenzo Intellectual Property Law, P.C.

(57) ABSTRACT

A modular electrical signal supply assembly includes a floor panel and at least one power/data strip (PDS) panel insert configured to provide an electrical signal to an electrical device. A vehicle includes an interior cabin with an electrical signal distribution system that includes a plurality of modular electrical signal supply assemblies and a plurality of electrical devices. Each modular electrical signal supply assembly includes a floor panel and at least one PDS panel insert. Each PDS panel insert is configured to provide an electrical signal to an electrical device and is electrically coupled to at least one other PDS panel insert. A method of assembling an interior cabin includes providing at least two modular electrical signal supply assemblies, each of which includes a floor panel and a PDS panel insert, positioning the floor panels in the interior cabin, and electrically coupling each PDS panel insert to at least one other PDS panel insert.

20 Claims, 7 Drawing Sheets

(56) References Cited

U.S. PATENT DOCUMENTS

| | | | |
|---|---|---|---|
| 7,063,562 B2 * | 6/2006 | Henley | B64C 1/18 |
| | | | 439/34 |
| 10,450,049 B2 * | 10/2019 | Spence | B64C 1/18 |
| 2013/0014263 A1 * | 1/2013 | Porcello | H04L 63/0272 |
| | | | 726/25 |

OTHER PUBLICATIONS

U.S. Appl. No. 15/287,949, filed Oct. 7, 2016, Ibrahim et al.

* cited by examiner

MODULAR ELECTRICAL SIGNAL SUPPLY ASSEMBLIES, VEHICLES, AND RELATED METHODS

FIELD

The present disclosure relates to modular electrical signal supply assemblies.

BACKGROUND

Vehicles configured for passenger transport may include passenger seats with electrical devices incorporated into and/or otherwise associated with the passenger seats. For example, a passenger seat may include a video display screen, an electrical charging port, and/or another electrical device for the passenger's use. The passenger seats may be positioned in an interior cabin of the vehicle with a floor surface such that electrical devices receive electrical power and/or data via wiring positioned below the floor surface. Traditional wiring schemes may include running wires or wire bundles from an electrical signal source to each individual electrical device as the passenger seats are installed. Such a wiring scheme requires that the wiring design be individually customized to a given passenger seat layout, resulting in a high engineering burden and/or factory install cost due to lengthy installation time. Thus, modifying a wiring scheme for a new passenger seat layout and/or repairing a portion of the wiring scheme may necessitate a substantial or complete overhaul of the wiring system.

SUMMARY

Modular electrical signal supply assemblies, vehicles, and related methods are disclosed. A modular electrical signal supply assembly for an interior cabin of a vehicle includes a floor panel with an upper face sheet and a core layer configured to add rigidity to the floor panel and positioned underneath the upper face sheet. The modular electrical signal supply assembly further includes at least one power/data strip (PDS) panel insert positioned underneath the upper face sheet and along an edge of the floor panel. The PDS panel insert is configured to provide an electrical signal to at least one electrical device positioned within the interior cabin.

A vehicle includes an interior cabin and an electrical signal distribution system positioned within the interior cabin. The interior cabin includes at least one sub-floor surface structure configured to retain at least one passenger seat in position within the interior cabin and at least one aisle extending at least substantially parallel to a cabin longitudinal axis, such that the aisle is configured to permit a passenger to access a passenger seat. The electrical signal distribution system includes a plurality of modular electrical signal supply assemblies and a plurality of electrical devices. Each modular electrical signal supply assembly includes a floor panel with an upper face sheet, a lower face sheet, and a core layer positioned between the upper face sheet and the lower face sheet. Each modular electrical signal supply assembly further includes at least one power/data strip (PDS) panel insert positioned between the upper face sheet and the lower face sheet and along an edge of the floor panel. Each PDS panel insert is configured to provide an electrical signal to at least one of the plurality of electrical devices. Each PDS panel insert is selectively electrically coupled to at least one other PDS panel insert by a jumper configured to transmit the electrical signal. Each modular electrical signal supply assembly is mounted to at least one sub-floor surface structure.

A method of assembling an interior cabin of a vehicle includes providing at least two modular electrical signal supply assemblies, each modular electrical signal supply assembly including a floor panel with an upper face sheet and a core layer positioned underneath the upper face sheet, and at least one power/data strip (PDS) panel insert positioned underneath the upper face sheet and along an edge of the floor panel, such that the PDS panel insert is configured to provide an electrical signal to at least one electrical device positioned within the interior cabin. The method further includes positioning the at least two floor panels at a lower surface of the interior cabin to at least partially define a floor surface and electrically coupling each PDS panel insert to at least one other PDS panel insert to form a signal supply chain configured to transmit the electrical signal between the PDS panel inserts.

DESCRIPTION

Figure 1:
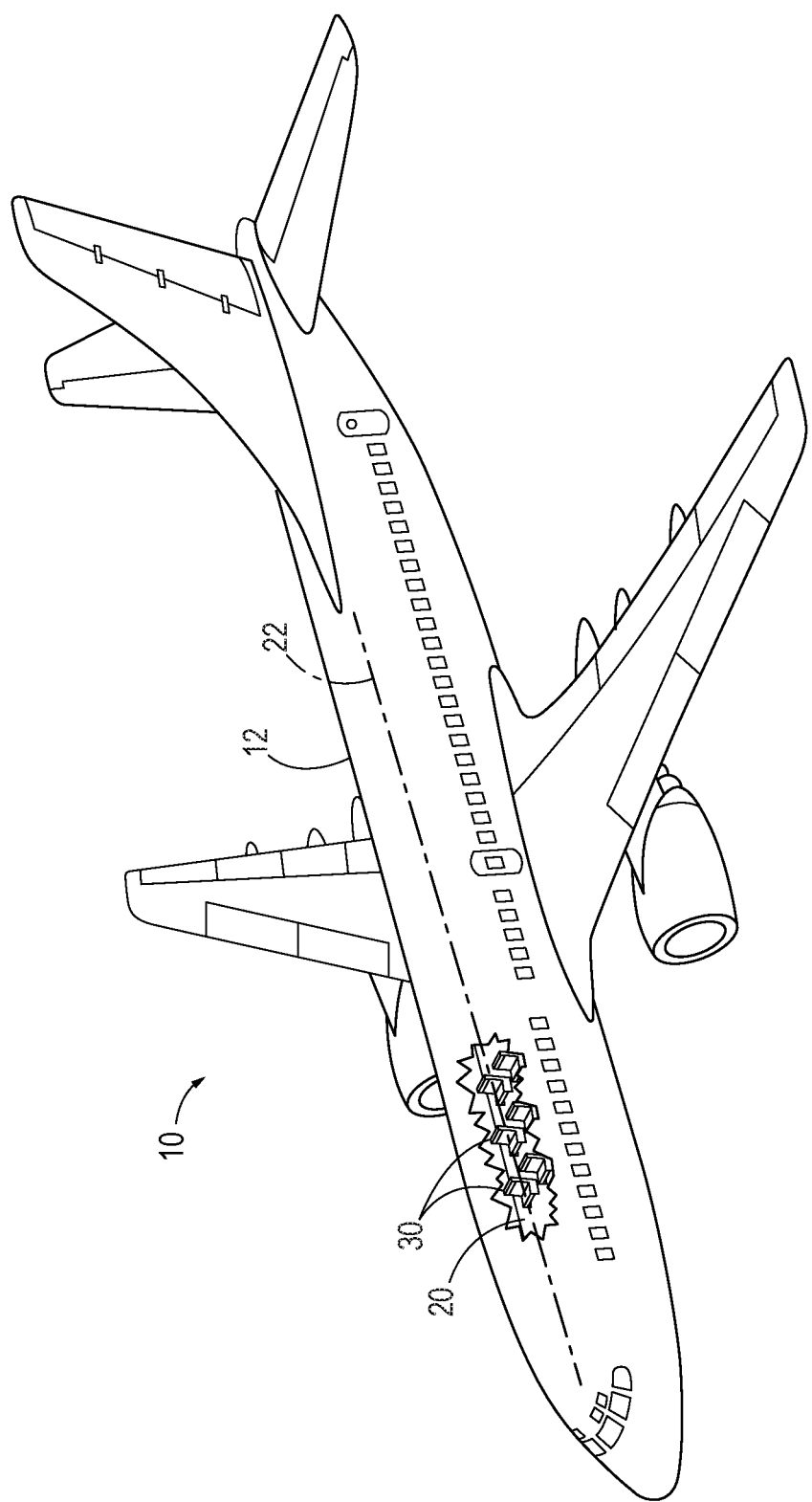
FIG. 1 is a perspective view of an example aircraft.

FIGS. 1-8 provide illustrative, non-exclusive examples of modular electrical signal supply assemblies 100, of electrical signal distribution systems 200 including modular electrical signal supply assemblies 100, and/or of vehicles 10 including modular electrical signal supply assemblies 100 and/or electrical signal distribution systems 200, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

FIG. 1 is an illustration of an example vehicle 10 that includes modular electrical signal supply assemblies 100 according to the present disclosure. The vehicle 10 generally may be utilized to transport persons and/or cargo. As illustrated in FIG. 1, the vehicle 10 may be an aircraft with a fuselage 12 that encloses an interior cabin 20. The interior cabin 20 may contain a plurality of passenger seats 30 distributed about a cabin longitudinal axis 22.

Figure 2:
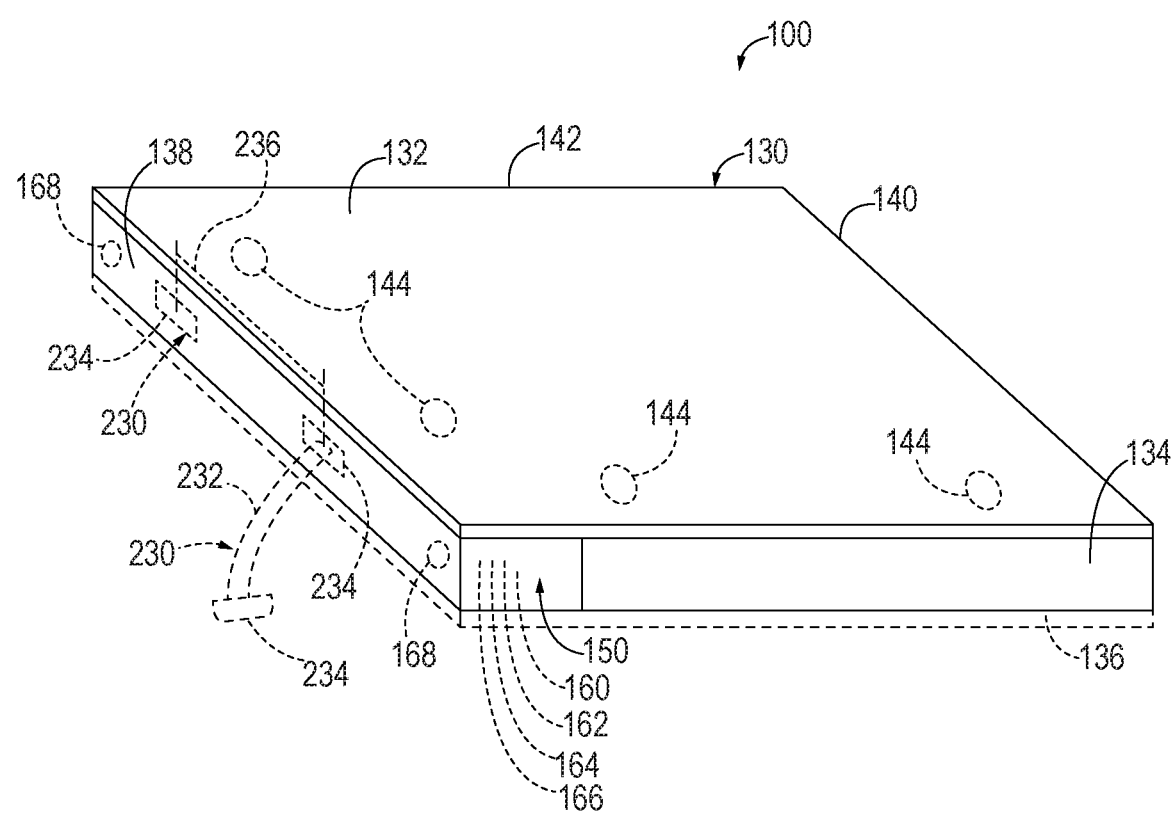
FIG. 2 is a schematic front perspective view representing modular electrical signal supply assemblies according to the present disclosure.
Figure 3:
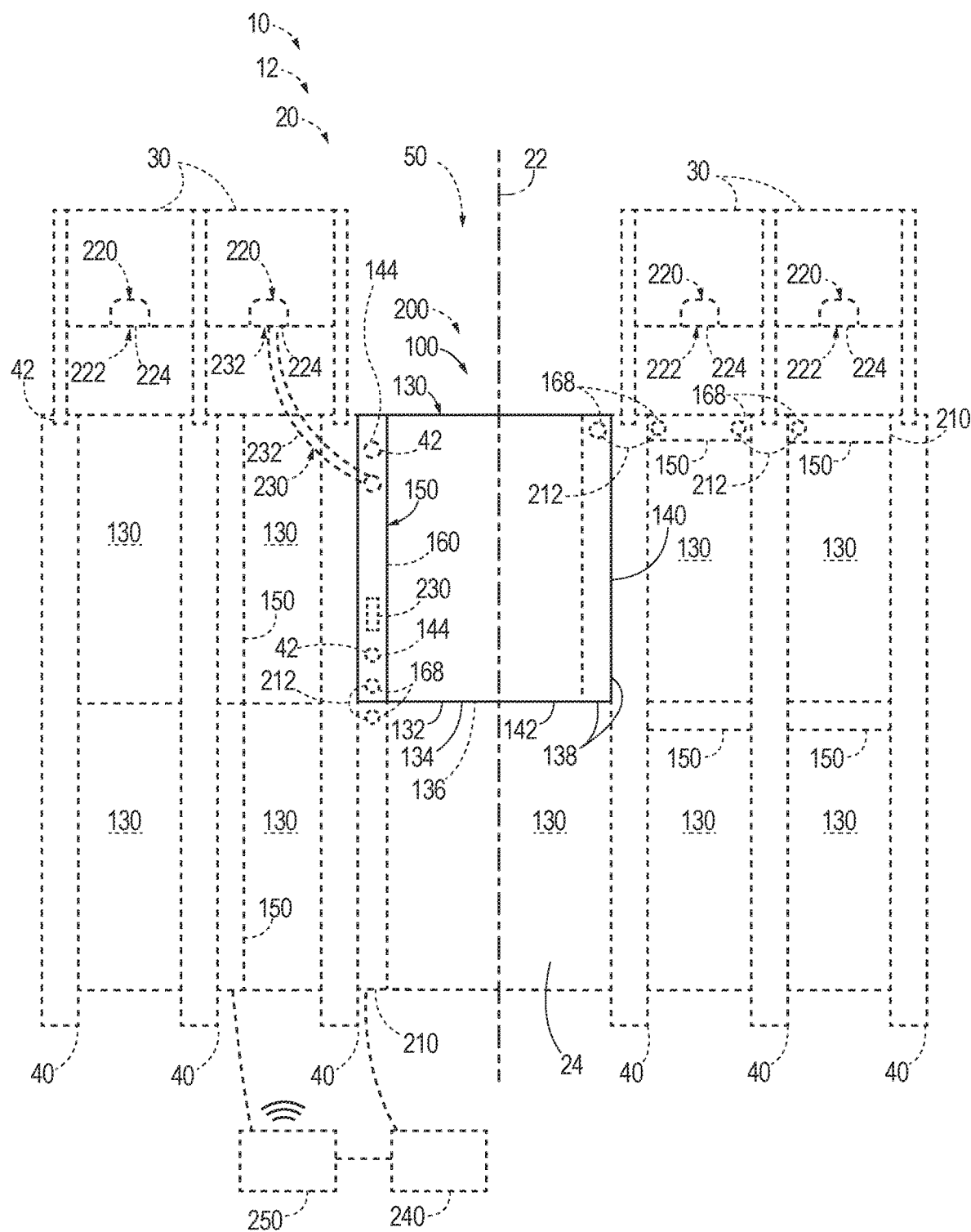
FIG. 3 is a schematic plan view representing an interior cabin of a vehicle including modular electrical signal supply assemblies according to the present disclosure.
Figure 4:
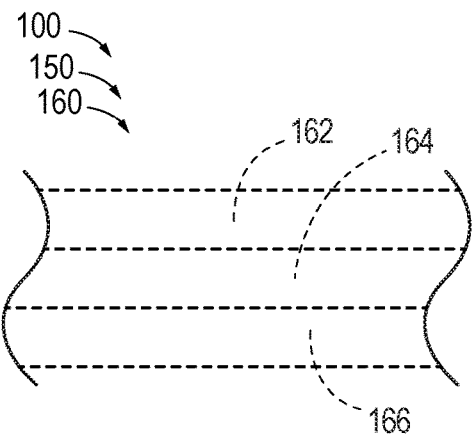
FIG. 4 is a schematic elevation view representing printed circuit boards according to the present disclosure.

FIGS. 2-4 are schematic views of illustrative, non-exclusive examples of modular electrical signal supply assemblies 100, which may be positioned in and/or form a portion of the interior cabin 20, and/or of electrical signal distribution systems 200 including the modular electrical signal supply assemblies 100. As schematically illustrated in FIG. 2, a modular electrical signal supply assembly 100 includes a floor panel 130 with an upper face sheet 132 and a core layer 134 positioned underneath the upper face sheet 132. The core layer 134 is configured to add rigidity to the floor panel 130. The modular electrical signal supply assembly 100 further includes at least one power/data strip (PDS) panel insert 150 configured to provide an electrical signal to at least one electrical device 220 positioned within the interior cabin 20 (not illustrated in FIG. 2). As further schematically illustrated in FIG. 2, the floor panel 130 also may include a lower face sheet 136 positioned underneath at least one of the core layer 134 and the PDS panel insert 150. In such an embodiment, the core layer 134 and/or the PDS panel insert 150 may be described as being positioned at least substantially between the upper face sheet 132 and the lower face sheet 136. In such an embodiment, the floor panel 130 also may be referred to as a sandwich panel and/or as a sandwich floor panel.

The PDS panel insert 150 is positioned along an edge 138 of the floor panel 130 and underneath the upper face sheet 132. Stated differently, the PDS panel insert 150 may be described as replacing the core layer 134 along the edge 138 of the floor panel 130. The PDS panel insert 150 may be positioned along any appropriate edge 138 of the floor panel 130. For example and as illustrated in FIG. 2, the floor panel 130 may be generally rectangular with at least one long edge 140 and at least one short edge 142, and the PDS panel insert 150 may be positioned along the long edge 140 and/or along the short edge 142 of the floor panel 130. As used herein, the long edge 140 also may be referred to as a longitudinal edge 140, and/or the short edge 142 also may be referred to as a transverse edge 142.

As used herein, positional terms such as "upper," "lower," "above," "below," "underneath," and the like may be used to describe spatial relationships between components of modular electrical signal supply assemblies 100, of electrical signal distribution systems 200, and/or of vehicles 10 in an illustrative, non-limiting manner, and generally refer to a configuration in which the floor panel 130 extends at least substantially horizontally within the interior cabin 20. For example, a passenger seat 30 may be described as being positioned above a floor panel 130 when the passenger seat 30 and the floor panel 130 are installed within the interior cabin 20. Such terms are provided as context only and do not limit component parts of modular electrical signal supply assemblies 100, of electrical signal distribution systems 200, and/or of vehicles 10 to always be in a specific orientation relative to ground.

The PDS panel insert 150 may be configured to provide the electrical signal to the electrical device 220 in any appropriate manner. For example, and as schematically illustrated in FIGS. 2-3, the modular electrical signal supply assembly 100 may include an outlet 230 configured to electrically couple the PDS panel insert 150 to the electrical device 220. As schematically illustrated in FIG. 2, the outlet 230 may include an outlet connector interface 234 configured to be selectively electrically coupled to the electrical device 220, such as via an input 222 and/or an input connector interface 224 of the electrical device 220. As used herein, the terms "electrically connected" and/or "electrically coupled" may refer to two or more electronic devices and/or components that are coupled by an electrically conductive medium such that an electric signal may propagate between the electronic devices in a controlled and/or predictable manner. As used herein, the terms "selectively electrically connected" and/or "selectively electrically coupled" may refer to an electrical connection that may be selectively and repeatedly formed and broken without damaging the electrical devices and/or the connectors that form the electrical connection.

The outlet connector interface 234 may include and/or be any appropriate structure for conveying the electrical signal between the PDS panel insert 150 and the electrical device 220. As examples, the outlet connector interface 234 may include and/or be a plug, a male plug, a female plug, a receptacle, a coaxial connector, a pin header, a header connector, an edge connector, an Ethernet connector, and/or a USB connector. As schematically illustrated in FIG. 2, the outlet connector interface 234 may be statically fixed to the PDS panel insert 150 and/or may be incorporated into the PDS panel insert 150. Alternatively, the outlet 230 may include an outlet cord 232 extending from the PDS panel insert 150, and the outlet connector interface 234 may be positioned on the outlet cord 232. The outlet cord 232 may be hard-wired to the PDS panel insert 150 and/or may be fixedly coupled to the PDS panel insert 150. Stated differently, the outlet cord 232 may not be configured to be removed from the PDS panel insert without damaging the outlet cord 232 and/or the PDS panel insert 150. Alternatively, the outlet cord 232 may be configured to be selectively electrically coupled to the PDS panel insert 150, such as via an outlet connector interface 234 that is statically fixed to and/or incorporated into the PDS panel insert 150. In such an embodiment, the outlet 230 may include a first outlet connector interface 234 that is statically fixed to and/or incorporated into the PDS panel insert 150, the outlet cord 232 selectively coupled to the first outlet connector interface 234, and a second outlet connector interface 234 positioned on the outlet cord distal the first outlet connector interface 234.

The input connector interface 224 of the electrical device 220 may include and/or be any appropriate structure for selectively electrically coupling the electrical device 220 to the outlet 230 of the modular electrical signal supply assembly 100. As examples, the input connector interface 224 may include a plug, a male plug, a female plug, a receptacle, a coaxial connector, a pin header, a header connector, an edge connector, an Ethernet connector, and/or a USB connector. The input connector interface 224 may be configured to be electrically coupled to the outlet connector interface 234, such as via the outlet cord 232 extending between and electrically coupled to each of the input connector interface 224 and the outlet connector interface 234. Additionally or alternatively, the input 222 of the electrical device 220 may include an input cord that extends from the electrical device 220 and that includes the input connector interface 224.

The modular electrical signal supply assembly 100 may include any appropriate number of outlets 230, which may be positioned on the PDS panel insert 150 in any appropriate manner. For example, the modular electrical signal supply assembly 100 may include a plurality of outlets 230 distributed along the PDS panel insert 150 and separated by an outlet spacing 236. As more specific examples, the modular electrical signal supply assembly 100 may include at least two outlets 230, at least three outlets 230, at least four outlets 230, at least five outlets 230, at least 10 outlets 230, and/or at least 20 outlets 230. The outlet spacing 236 may be any appropriate distance, such as a distance that is selected to correspond to a seat pitch of the plurality of passenger seats 30. As more specific examples, the outlet spacing 236 may be at least 20 centimeters (cm), at least 40 cm, at least 60 cm, at least 80 cm, at least 100 cm, at least 120 cm, at most 130 cm, at most 110 cm, at most 90 cm, at most 70 cm, at most 50 cm, at most 30 cm, 30-50 cm, 40-60 cm, 50-70 cm, 60-80 cm, 70-90 cm, 80-100 cm, and/or 90-110 cm.

The PDS panel insert 150 may include any appropriate structure for conveying and/or delivering the electric signal. For example, and as schematically illustrated in FIG. 2, the PDS panel insert 150 may include a printed circuit board (PCB) 160, which may be a multi-layered PCB 160. For example, and as schematically illustrated in FIG. 4, the PCB 160 may include at least one power layer 162 configured to transmit electrical power, at least one data layer 164 configured to transmit a data signal, and/or at least one ground layer 166 configured to provide an electrical ground. While FIG. 4 schematically illustrates the PCB 160 as including one power layer 162, one data layer 164, and one ground layer 166, this is not required, and it is additionally within the scope of the present disclosure that the PCB 160 may include any number of power layers 162, data layers 164, and/or ground layers 166, and/or may not include a power layer 162, may not include a data layer 164, and/or may not include a ground layer 166. The power layer 162, the data layer 164, and the ground layer 166, when present, may be arranged in any appropriate configuration. For example, the ground layer 166 may be configured to provide electrical shielding to at least one power layer 162 and/or at least one data layer 164. As a more specific example, the ground layer 166 may be positioned between the power layer 162 and the data layer 164, such that the power layer 162 and the data layer 164 are separated by the ground layer 166. Additionally or alternatively, the PCB 160 may be a potted PCB that is at least partially encased in a resin, a thermosetting plastic, a polymer, polyurethane, silicone, and/or rubber.

FIG. 3 provides a schematic plan view of an interior cabin 20 that includes at least one modular electrical signal supply assembly 100. As discussed, the PDS panel insert 150 of the modular electrical signal supply assembly 100 is configured to provide an electrical signal to at least one electrical device 220 positioned within the interior cabin 20. As used herein, an electrical signal distribution system 200 may generally refer to the combination of at least one modular electrical signal supply assembly 100 and at least one electrical device 220 electrically coupled to at least one PDS panel insert 150 of the modular electrical signal supply assembly 100. The electrical device 220 may be associated with, mounted to, and/or incorporated into a passenger seat 30. However, this is not required, and it is additionally within the scope of the present disclosure that the electrical device 220 may not be associated with a passenger seat 30, and/or may be associated with any appropriate equipment positioned within the interior cabin 20. As examples, the electrical device 220 may include and/or be a lighting assembly, a display, a video monitor, a sensor, an electrical power supply, a charging port, a USB charging port, a data port, a USB data port, an Ethernet port, and/or a wireless communication source. The electrical signal provided to the electrical device 220 by the PDS panel insert 150 may include and/or be an electrical power signal, a data signal, and/or an electrical ground.

As schematically illustrated in FIG. 3, the interior cabin 20 and/or the electrical signal distribution system 200 may include a plurality of modular electrical signal supply assemblies 100 with a corresponding plurality of PDS panel inserts 150. The electrical signal distribution system 200 further may include a plurality of electrical devices 220, such as may be installed on, incorporated into, and/or otherwise associated with a plurality of passenger seats 30. An electrical device 220 may be electrically coupled to a respective single PDS panel insert 150 of the plurality of PDS panel inserts 150, and may be electrically coupled to a single outlet 230 of the corresponding modular electrical signal supply assembly 100 or to each of a plurality of outlets 230 of the corresponding modular electrical signal supply assembly 100. Alternatively, a single electrical device 220 may be electrically connected to each of a plurality of PDS panel inserts 150. Additionally or alternatively, a single PDS panel insert 150 may be electrically coupled to a respective single electrical device 220, or may be electrically coupled to each of a plurality of electrical devices 220, such as via a respective plurality of outlets 230 of the modular electrical signal supply assembly 100.

Each of the plurality of PDS panel inserts 150 may be electrically coupled to one another to form a signal supply chain 210 configured to transmit the electrical signal between the plurality of PDS panel inserts 150. For example, each PDS panel insert 150 may include a jumper terminal 168, and the electrical signal distribution system 200 may include at least one jumper 212 configured to be selectively electrically coupled to the jumper terminals 168 of each of at least two PDS panel inserts 150 to at least partially form the signal supply chain 210. Stated differently, the electrical signal distribution system 200 may include a first modular electrical signal supply assembly 100 with a first floor panel 130 and a first PDS panel insert 150 with a first jumper terminal 168, and further may include a second modular electrical signal supply assembly 100 with a second floor panel 130 and a second PDS panel insert 150 with a second jumper terminal 168, and the jumper 212 may be configured to be selectively electrically coupled to each of the first jumper terminal 168 and the second jumper terminal 168 to transmit the electrical signal between the first PDS panel insert 150 and the second PDS panel insert 150. In such a configuration, the first PDS panel insert 150 and the second PDS panel insert 150 may be described as at least partially defining the signal supply chain 210. In this manner, the plurality of modular electrical signal supply assemblies 100 may facilitate the formation of an electrical signal distribution system 200 and/or a signal supply chain 210 that may readily be customized and/or optimized for a given distribution of electrical devices 220 and/or passenger seats 30 within the interior cabin 20. For example, because each modular electrical signal supply assembly 100 may be selectively and individually chosen, configured, oriented, positioned, replaced, and/or serviced, an interior cabin 20 that includes an electrical signal distribution system 200 according to the present disclosure may be assembled, disassembled, serviced, and/or maintained more readily relative to a distribution system that relies on point-to-point wiring.

As schematically illustrated in FIG. 3, the electrical signal distribution system 200 may include a plurality of modular electrical signal supply assemblies 100 that are positioned such that the plurality of PDS panel inserts 150 are at least substantially collinear. In such an embodiment, the plurality of PDS panel inserts 150 that are at least substantially collinear may include each PDS panel insert 150 in the electrical signal distribution system 200, or may include a subset of the PDS panel inserts 150 in the electrical signal distribution system 200. As an example, the plurality of modular electrical signal supply assemblies 100 may be positioned such that the plurality of PDS panel inserts 150 are parallel, or at least substantially parallel, to the cabin longitudinal axis 22. As a more specific example, and as illustrated in the left-hand side of FIG. 3, a plurality of PDS panel inserts 150 may be positioned along the long edges 140 of a respective plurality of floor panels 130, and the long edges 140 of each floor panel 130 of the respective plurality of floor panels 130 may be parallel, or at least substantially parallel, to the cabin longitudinal axis 22. However, this is not required, and it is additionally within the scope of the present disclosure that each PDS panel insert 150 may be positioned along the short edge 142 of the respective floor panel 130, and/or that the short edge 142 of each floor panel 130 is parallel, or at least substantially parallel, to the cabin longitudinal axis 22. As an example, and as illustrated in dashed lines in the right-hand side of FIG. 3, one or more modular electrical signal supply assemblies 100 may be positioned such that the plurality of PDS panel inserts 150 are perpendicular, or at least substantially perpendicular, to the cabin longitudinal axis 22.

As schematically illustrated in FIG. 3, the electrical signal distribution system 200 further may include an electrical signal source 240 configured to provide the electrical signal to the signal supply chain 210 and/or to at least one PDS panel insert 150 of the electrical signal distribution system 200. The electrical signal source 240 may be electrically coupled to the PDS panel insert 150 in any appropriate manner, such as via the jumper terminal 168 of the PDS panel insert 150. Additionally or alternatively, the electrical signal distribution system 200 may include a master control unit 250 in electrical communication with the at least one electrical device 220 and configured to control the electrical signal that is provided to each electrical device 220 by the electrical signal distribution system 200. The master control unit 250 may electrically communicate with the at least one electrical device 220 in any appropriate manner, such as via the electrical signal source 240, via the signal supply chain 210, and/or via a wireless signal.

The electrical signal that the PDS panel insert 150 provides to the electrical device 220 may have any appropriate electrical characteristics. For example, the electrical signal may include and/or be an electrical power signal with any appropriate current and/or voltage, such as a current and/or voltage sufficient to provide electrical power to a lighting assembly, a video display, an audio source, a charging port, and/or a USB charging port. As examples, the electrical signal may include an electrical current that is at least 100 milliamps (mA), at least 300 mA, at least 500 mA, at least 1 ampere (A), at least 3 A, at least 5 A, at most 10 A, at most 7 A, at most 2 A, at most 1 A, at most 700 mA, and/or at most 200 mA, and/or may include and/or be an alternating current and/or a direct current. Additionally or alternatively, the electrical power signal may include an electrical voltage that is at least 100 millivolts (mV), at least 500 mV, at least 1 volt (V), at least 5 V, at least 10 V, at least 50 V, at least 100 V, at least 500 V, at most 700 V, at most 200 V, at most 70 V, at most 20 V, at most 7 V, at most 2 V, at most 700 mV, and/or at most 200 mV. Additionally or alternatively, the electrical signal may include and/or be a data signal with any appropriate bandwidth, such as a bandwidth sufficient to provide data, services, information, a video signal, an audio signal, and/or an Internet connection to the electrical device 220. As examples, the data signal may have a bandwidth that is at least 10 kilobits per second (kbps), at least 100 kbps, at least 1 megabit per second (Mbps), at least 10 Mbps, at least 100 Mbps, at least 1 gigabit per second (Gbps), at least 10 Gbps, at most 50 Gbps, at most 5 Gbps, at most 500 Mbps, at most 50 Mbps, at most 5 Mbps, at most 500 kbps, and/or at most 50 kbps.

As schematically illustrated in FIG. 3, the floor panel 130 may be configured to be coupled to a sub-floor surface structure 40 within the interior cabin 20 to at least partially define a floor surface 24. The floor surface 24 may define at least one aisle 50 extending at least substantially parallel to the cabin longitudinal axis 22 and configured to permit a passenger to access a passenger seat 30. The sub-floor surface structure 40 may include and/or be any appropriate structure for supporting the floor panel 130, such as a structure configured to retain at least one passenger seat 30 within the interior cabin 20. In such an embodiment, the sub-floor surface structure 40 may include and/or be a seat track. Each floor panel 130 may be coupled to the sub-floor surface structure 40 in any appropriate manner. As an example, and as schematically illustrated in FIGS. 2-3, the sub-floor surface structure 40 may include a plurality of sub-floor surface structure mounting holes 42 (not illustrated in FIG. 2), and the floor panel 130 may include a plurality of floor panel mounting holes 144 configured to align with a corresponding plurality of sub-floor surface structure mounting holes, such that the floor panel 130 is configured to be coupled to the sub-floor surface structure 40 by a plurality of mechanical fasteners extending through a corresponding plurality of floor panel mounting holes 144 and sub-floor surface structure mounting holes 42. The plurality of floor panel mounting holes 144 may extend through the PDS panel insert 150, such that the PDS panel insert 150 also may be described as including and/or at least partially defining the plurality of floor panel mounting holes 144. The floor panel mounting hole 144 (and/or the portion of the floor panel 130 and/or of the PDS panel insert 150 that includes and/or defines the floor panel mounting hole) additionally may include a fastener engagement structure configured to receive, accommodate, and/or capture the mechanical fastener, such as a pass-through fastener insert, a bonded fastener insert, a threaded fastener insert, a threaded bore, and/or a mechanical fastener capture mechanism. Stated differently, the floor panel mounting hole 144 may extend through the PDS panel insert 150 such that the PDS panel insert 150 may receive and/or engage the mechanical fastener in a similar manner as a floor panel 130 that lacks the PDS panel insert 150.

The floor panel 130 may have any appropriate construction, such as may be configured to maximize strength and/or rigidity while minimizing weight and/or material cost. For example, the upper face sheet 132, the core layer 134, and/or the lower face sheet 136 may be constructed of any appropriate material, examples of which include a plastic, a polymer, an aramid polymer, a metal, aluminum, a composite material, and a fiberglass. Additionally or alternatively, the core layer 134 may include a structure configured to enhance a strength-to-weight ratio of the core layer 134, such as a honeycomb structure. The core layer 134 may be integrally formed with the upper face sheet 132 and/or with the lower face sheet 136. Additionally or alternatively, the core layer 134 may be coupled to the upper face sheet 132 and/or to the lower face sheet 136, such as with an adhesive and/or a mechanical fastener.

The PDS panel insert 150 may be incorporated into and/or coupled to the floor panel 130 in any appropriate manner. For example, the PDS panel insert 150 may be coupled to the upper face sheet 132, the core layer 134, and/or the lower face sheet 136, such as with an adhesive and/or with a mechanical fastener. The PDS panel insert 150 may extend along any appropriate proportion of a length of the edge 138 of the floor panel 130 on which the PDS panel insert 150 is positioned. As examples, the PDS panel insert 150 may extend along at least 25%, at least 50%, at least 75%, at least 90%, at least 95%, and/or 100% of a length of the edge 138 of the floor panel 130. The PDS panel insert 150 also may be configured such that the structural properties of the floor panel 130 are similar to those of an analogous floor panel that does not enclose the PDS panel insert 150. In this manner, and as discussed, the PDS panel insert 150 may be described as replacing the core layer 134 along the edge 138 of the floor panel 130 without compromising structural properties of the floor panel 130 relative to a floor panel 130 that lacks the PDS panel insert 150. As examples, the PDS panel insert 150 may have a thickness that is at least substantially equal to a thickness of the core layer 134, and/or may have a rigidity that is substantially equal to and/or greater than a rigidity of the core layer 134. The modular electrical signal supply assembly 100 and/or the electrical signal distribution system 200 generally may be configured such that the PDS panel insert 150 is at least substantially concealed from view when the modular electrical signal supply assembly 100 is installed in the interior cabin 20.

Turning now to FIGS. 5-8, illustrative non-exclusive examples of modular electrical signal supply assemblies 100 and electrical signal distribution systems 200 are illustrated. Where appropriate, the reference numerals from the schematic illustrations of FIGS. 1-4 are used to designate corresponding parts of the examples of FIGS. 5-8; however, the examples of FIGS. 5-8 are non-exclusive and do not limit the modular electrical signal supply assemblies 100 and/or the electrical signal distribution systems 200 to the illustrated embodiments of FIGS. 5-8. That is, the modular electrical signal supply assemblies 100 and/or the electrical signal distribution systems 200 are not limited to the specific embodiments 5-8, and the modular electrical signal supply assemblies 100 and/or the electrical signal distribution systems 200 may incorporate any number of the various aspects, configurations, characteristics, properties, etc. of the modular electrical signal supply assemblies 100 and/or the electrical signal distribution systems 200 that are illustrated in and discussed with reference to the schematic representations of FIGS. 1-4 and/or the embodiments of FIGS. 5-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 5-8; however, it is within the scope of the present disclosure that the previously discussed features, variants, etc. may be utilized with the examples of FIGS. 5-8.

Figure 5:
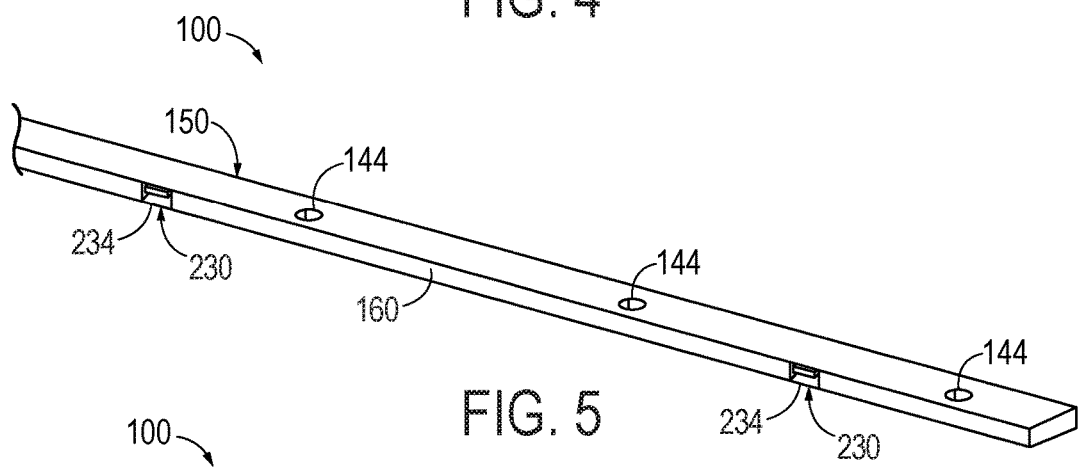
FIG. 5 is a front perspective view representing a portion of a modular electrical signal supply assembly according to the present disclosure.
Figure 6:
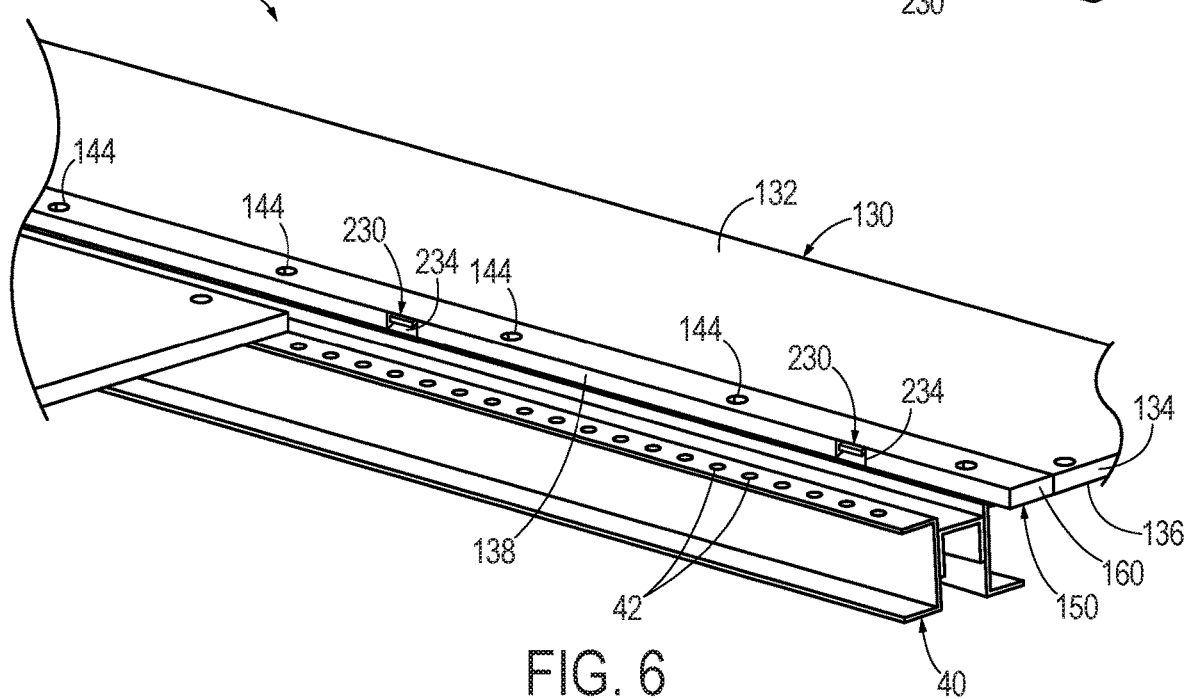
FIG. 6 is a front perspective view representing a modular electrical signal supply assembly mounted on a sub-floor surface structure according to the present disclosure.

FIG. 5 illustrates an example of a portion of a modular electrical signal supply assembly 100 that includes a PDS panel insert 150 with a plurality of floor panel mounting holes 144 and a plurality of outlets 230. Each outlet 230 includes an outlet connector interface 234 that is incorporated into the PDS panel insert 150. FIG. 6 illustrates the PDS panel insert 150 of FIG. 5 coupled to a floor panel 130 that includes an upper face sheet 132, a core layer 134, and a lower face sheet 136, such that the PDS panel insert 150 is positioned between the upper face sheet 132 and the lower face sheet 136 and adjacent to the core layer 134. The upper face sheet 132 includes the plurality of floor panel mounting holes 144. FIG. 6 further illustrates the modular electrical signal supply assembly 100 positioned with respect to a sub-floor surface structure 40 such that each of the floor panel mounting holes 144 is aligned with a corresponding sub-floor surface structure mounting hole 42 of the sub-floor surface structure 40.

Figure 7:
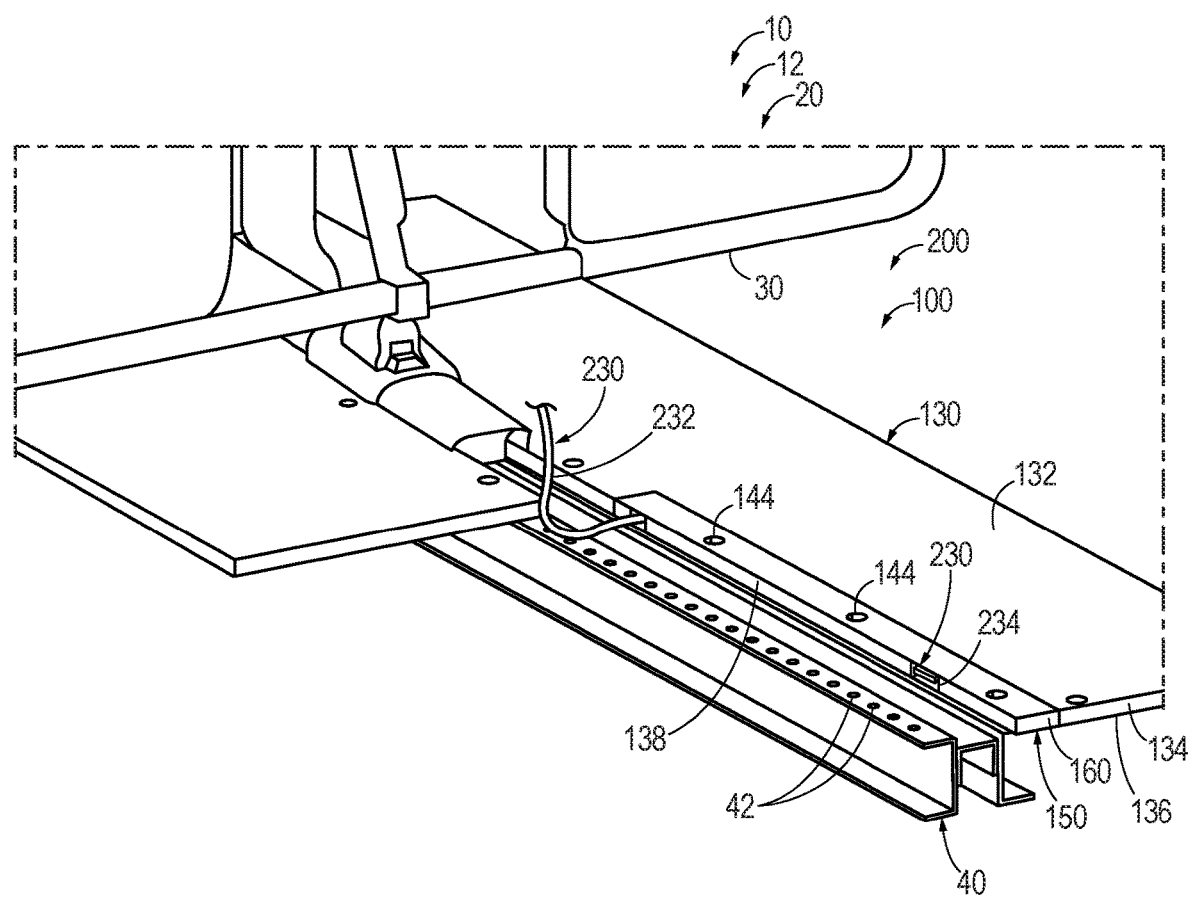
FIG. 7 is a front perspective view representing a modular electrical signal supply assembly positioned in an interior cabin of a vehicle according to the present disclosure.
Figure 8:
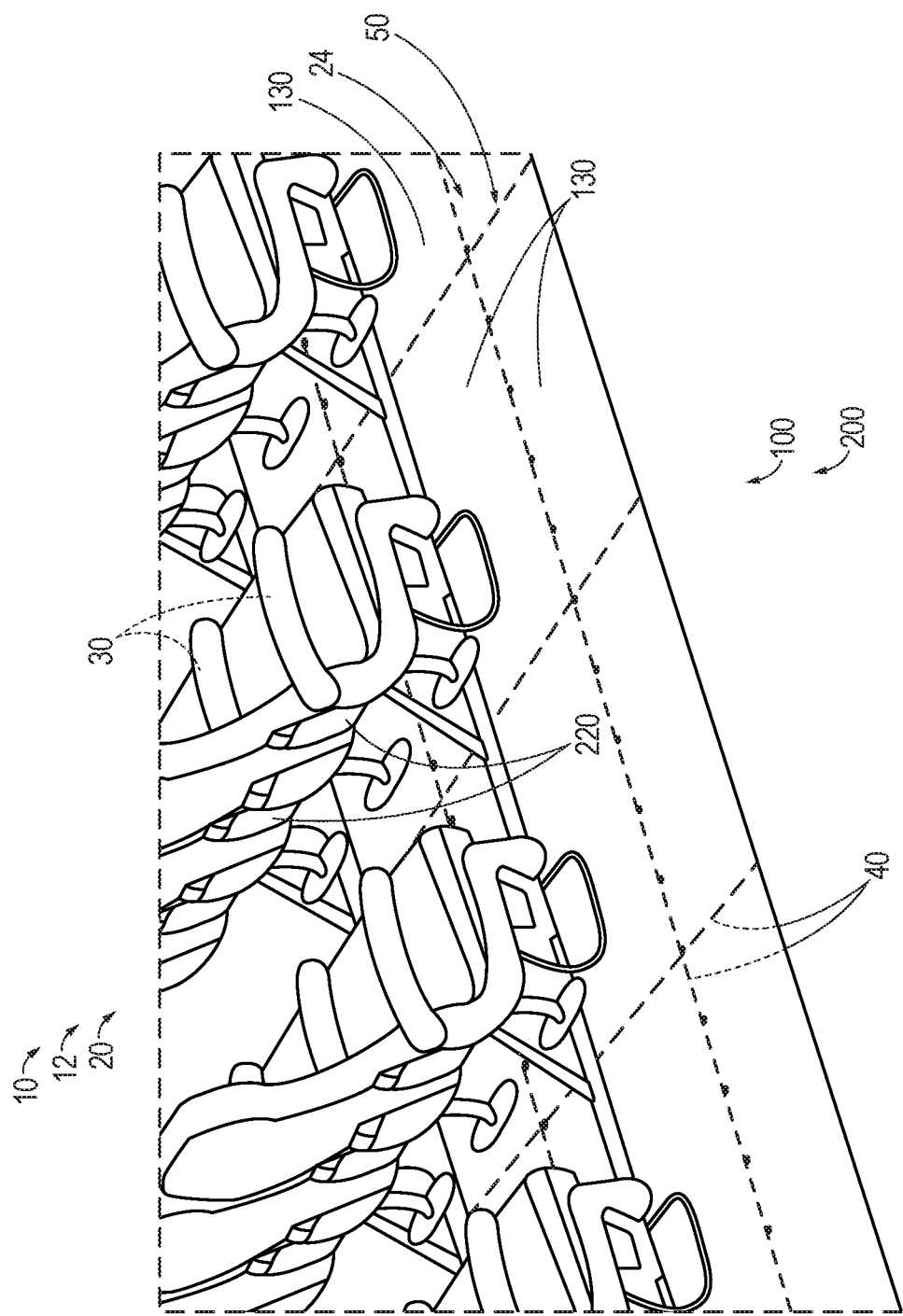
FIG. 8 is a perspective view representing modular electrical signal supply assemblies positioned in an interior cabin of a vehicle according to the present disclosure.

FIGS. 7-8 illustrate the modular electrical signal supply assembly 100 of FIGS. 5-6 positioned within an interior cabin 20 of a vehicle 10. Specifically, FIG. 7 illustrates the modular electrical signal supply assembly 100 with an outlet cord 232 selectively coupled to the left-hand outlet 230, and further illustrates a passenger seat 30 mounted to the sub-floor surface structure 40. FIG. 8 provides an illustration of a portion of an assembled interior cabin 20 that includes a plurality of floor panels 130 positioned to define a floor surface 24 that defines an aisle 50 adjacent a plurality of passenger seats 30 installed on a plurality of sub-floor surface structures 40. Each passenger seat 30 has an electrical device 220 mounted on a rear portion of the passenger seat such that the electrical device 220 may be utilized by a passenger seated in the passenger seat 30 facing the electrical device 220.

Figure 9:
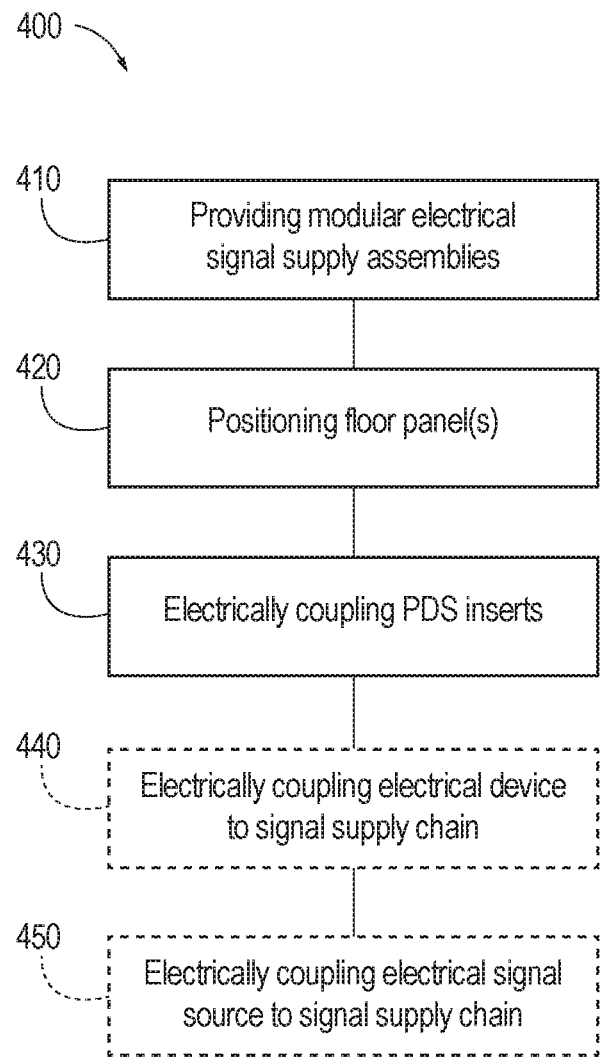
FIG. 9 is a flowchart schematically representing methods of assembling an interior cabin of a vehicle according to the present disclosure.

FIG. 9 schematically provides a flowchart that represents illustrative, non-exclusive examples of methods according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

As seen in FIG. 9, a method 400 of assembling an interior cabin of a vehicle (such as the interior cabin 20 of the vehicle 10) includes providing 410 at least two modular electrical signal supply assemblies (such as the modular electrical signal supply assemblies 100), such that each modular electrical signal supply assembly includes a floor panel (such as the floor panel 130) with an upper face sheet (such as the upper face sheet 132) and a core layer (such as the core layer 134) positioned underneath the upper face sheet and configured to add rigidity to the floor panel. The modular electrical signal supply assembly further includes at least one power/data strip (PDS) panel insert (such as the PDS panel insert 150) positioned underneath the upper face sheet and along an edge (such as the edge 138) of the floor panel. The PDS panel insert is configured to provide an electrical signal to at least one electrical device (such as the electrical device 220) positioned within the interior cabin.

The method 400 further includes positioning 420 the at least two floor panels at a lower surface of the interior cabin to at least partially define a floor surface (such as the floor surface 24), and still further includes electrically coupling 430 each PDS panel insert to at least one other PDS panel insert to form a signal supply chain (such as the signal supply chain 210) configured to transmit the electrical signal between the PDS panel inserts. The electrically coupling 430 may include coupling at least one PDS panel insert to at least one other PDS panel insert with a jumper (such as the jumper 212).

As further seen in FIG. 9, the method 400 additionally may include electrically connecting 440 the at least one electrical device to the signal supply chain. For example, the modular electrical signal supply assembly may include at least one outlet (such as the outlet 230) configured to electrically couple the PDS panel insert to the electrical device, and the outlet may include an outlet connector interface (such as the outlet connector interface 234) configured to be selectively electrically coupled to an input connector interface (such as the input connector interface 224) of the electrical device. In such an embodiment, the electrically connecting 440 may include electrically connecting the outlet connector interface and the input connector interface.

As still further seen in FIG. 9, the vehicle may include an electrical signal source (such as the electrical signal source 240) configured to provide the electrical signal to the PDS panel insert, and the method 400 further may include electrically coupling 450 the electrical signal source to the signal supply chain, such as via a jumper.

Illustrative, non-exclusive examples of inventive subject matter according to the present disclosure are described in the following enumerated paragraphs:

A. A modular electrical signal supply assembly for an interior cabin of a vehicle, the modular electrical signal supply assembly comprising:

a floor panel with an upper face sheet and a core layer positioned underneath the upper face sheet; wherein the core layer is configured to add rigidity to the floor panel; and at least one power/data strip (PDS) panel insert positioned underneath the upper face sheet and along an edge of the floor panel;

wherein the PDS panel insert is configured to provide an electrical signal to at least one electrical device positioned within the interior cabin.

A1.1. The modular electrical signal supply assembly of paragraph A, wherein the electrical signal comprises at least one of an electrical power signal, a data signal, and an electrical ground.

A1.2. The modular electrical signal supply assembly of paragraph A1.1, wherein the electrical signal comprises the electrical power signal, and wherein the electrical power signal has a current that is at least one of at least 100 milliamps (mA), at least 300 mA, at least 500 mA, at least 1 ampere (A), at least 3 A, at least 5 A, at most 10 A, at most 7 A, at most 2 A, at most 1 A, at most 700 mA, and at most 200 mA.

A1.3. The modular electrical signal supply assembly of any of paragraphs A1.1-A1.2, wherein the electrical signal comprises the electrical power signal, and wherein the electrical power signal has a voltage that is at least one of at least 100 millivolts (mV), at least 500 mV, at least 1 volt (V), at least 5 V, at least 10 V, at least 50 V, at least 100 V, at least 500 V, at most 700 V, at most 200 V, at most 70 V, at most 20 V, at most 7 V, at most 2 V, at most 700 mV, and at most 200 mV.

A1.4. The modular electrical signal supply assembly of any of paragraphs A-A1.3, wherein the electrical signal comprises an alternating current.

A1.5. The modular electrical signal supply assembly of any of paragraphs A-A1.4, wherein the electrical signal comprises a direct current.

A1.6. The modular electrical signal supply assembly of any of paragraphs A1.1-A1.5, wherein the electrical signal comprises the data signal, and wherein the data signal has a bandwidth that is at least one of at least 10 kilobits per second (kbps), at least 100 kbps, at least 1 megabit per second (Mbps), at least 10 Mbps, at least 100 Mbps, at least 1 gigabit per second (Gbps), at least 10 Gbps, at most 50 Gbps, at most 5 Gbps, at most 500 Mbps, at most 50 Mbps, at most 5 Mbps, at most 500 kbps, and at most 50 kbps.

A2.1. The modular electrical signal supply assembly of any of paragraphs A-A1.6, wherein the floor panel is configured to be coupled to a sub-floor surface structure within the interior cabin.

A2.2. The modular electrical signal supply assembly of paragraph A2.1, wherein the sub-floor surface structure comprises a sub-floor surface structure configured to retain at least one passenger seat in position within the interior cabin.

A2.3. The modular electrical signal supply assembly of paragraph A2.2, wherein the sub-floor surface structure comprises a plurality of sub-floor surface structure mounting holes positioned along a length of the sub-floor surface structure, wherein the floor panel comprises a plurality of floor panel mounting holes configured to align with a corresponding plurality of sub-floor surface structure mounting holes, and wherein the floor panel is configured to be coupled to the sub-floor surface structure by a plurality of mechanical fasteners extending through a corresponding plurality of floor panel mounting holes and sub-floor surface structure mounting holes.

A2.4. The modular electrical signal supply assembly of paragraph A2.3, wherein the PDS panel insert comprises the plurality of floor panel mounting holes.

A2.5. The modular electrical signal supply assembly of any of paragraphs A2.3-A2.4, wherein each of the plurality of floor panel mounting holes includes a fastener engagement structure configured to receive a corresponding mechanical fastener of the plurality of mechanical fasteners.

A2.6. The modular electrical signal supply assembly of paragraph A2.5, wherein the fastener engagement structure includes at least one of a pass-through fastener insert, a bonded fastener insert, a threaded fastener insert, a threaded bore, and a mechanical fastener capture mechanism.

A2.7. The modular electrical signal supply assembly of any of paragraphs A2.5-A2.6, wherein the PDS panel insert includes the fastener engagement structure.

A3.1. The modular electrical signal supply assembly of any of paragraphs A-A2.7, wherein the modular electrical signal supply assembly further comprises at least one outlet configured to electrically couple the PDS panel insert to the electrical device.

A3.2. The modular electrical signal supply assembly of paragraph A3.1, wherein the outlet comprises an outlet connector interface configured to be selectively electrically coupled to an input connector interface of the electrical device.

A3.3. The modular electrical signal supply assembly of paragraph A3.2, wherein the outlet connector interface comprises at least one of a plug, a male plug, a female plug, a receptacle, a coaxial connector, a pin header, a header connector, an edge connector, an Ethernet connector, and a USB connector.

A3.4. The modular electrical signal supply assembly of any of paragraphs A3.2-A3.3, wherein the outlet connector interface is statically fixed to the PDS panel insert.

A3.5. The modular electrical signal supply assembly of any of paragraphs A3.1-A3.4, wherein the outlet comprises an outlet cord extending from the PDS panel insert.

A3.6. The modular electrical signal supply assembly of paragraph A3.5, wherein the outlet connector interface is positioned on the outlet cord.

A3.7. The modular electrical signal supply assembly of any of paragraphs A3.5-A3.6, wherein the outlet cord is configured to be selectively electrically coupled to the PDS panel insert.

A3.8. The modular electrical signal supply assembly of any of paragraphs A3.5-A2.7, wherein the outlet comprises the outlet connector interface, wherein the outlet connector interface is a first outlet connector interface that is statically fixed to the PDS panel insert, wherein the outlet cord is configured to be selectively electrically coupled to the PDS panel insert via the first outlet connector interface, and wherein the outlet further comprises a second outlet connector interface positioned on the outlet cord distal the first outlet connector interface.

A3.9. The modular electrical signal supply assembly of any of paragraphs A3.5-A3.6, wherein the outlet cord is hard-wired to the PDS panel insert.

A3.10. The modular electrical signal supply assembly of any of paragraphs A3.1-A3.9, wherein the at least one outlet comprises a plurality of outlets distributed along the PDS panel insert and separated by an outlet spacing.

A3.11. The modular electrical signal supply assembly of paragraph A3.10, wherein the modular electrical signal supply assembly includes at least one of at least two outlets, at least three outlets, at least four outlets, at least five outlets, at least 10 outlets, and at least 20 outlets.

A3.12. The modular electrical signal supply assembly of any of paragraphs A3.10-A3.11, wherein the outlet spacing is configured to correspond to a seat pitch of a plurality of passenger seats.

A3.13. The modular electrical signal supply assembly of any of paragraphs A3.10-A3.12, wherein the outlet spacing is at least one of at least 20 centimeters (cm), at least 40 cm, at least 60 cm, at least 80 cm, at least 100 cm, at least 120 cm, at most 130 cm, at most 110 cm, at most 90 cm, at most 70 cm, at most 50 cm, at most 30 cm, 30-50 cm, 40-60 cm, 50-70 cm, 60-80 cm, 70-90 cm, 80-100 cm, and 90-110 cm.

A4.1. The modular electrical signal supply assembly of any of paragraphs A-A3.13, wherein the PDS panel insert comprises a printed circuit board (PCB), optionally a multi-layered PCB.

A4.2. The modular electrical signal supply assembly of paragraph A4.1, wherein the PCB comprises at least one of a power layer configured to transmit electrical power, a data layer configured to transmit a data signal, and a ground layer configured to provide an electrical ground.

A4.3. The modular electrical signal supply assembly of paragraph A4.2, wherein the PCB comprises the ground layer, and wherein the ground layer is configured to provide electrical shielding to at least one of a power layer and a data layer.

A4.4. The modular electrical signal supply assembly of any of paragraphs A4.2-A4.3, wherein the PCB comprises the power layer and the data layer separated by the ground layer.

A4.5. The modular electrical signal supply assembly of any of paragraphs A4.2-A4.4, wherein the PCB comprises at least one of a plurality of power layers, a plurality of data layers, and a plurality of ground layers.

A4.6. The modular electrical signal supply assembly of any of paragraphs A4.1-A4.5, wherein the PCB is a potted PCB that is at least partially encased in at least one of a resin, a thermosetting plastic, a polymer, polyurethane, silicone, and rubber.

A4.7. The modular electrical signal supply assembly of any of paragraphs A-A4.6, wherein the PDS panel insert comprises a jumper terminal configured to transmit the electrical signal to a separate PDS panel insert.

A4.8. The modular electrical signal supply assembly of paragraph A4.7, wherein the modular electrical signal supply assembly further comprises a jumper configured to be selectively electrically coupled to the jumper terminals of each of at least two PDS panel inserts.

A4.9. The modular electrical signal supply assembly of paragraph A4.8, wherein the modular electrical signal supply assembly is a first modular electrical signal supply assembly with a first floor panel and a first PDS panel insert, wherein the jumper terminal is a first jumper terminal, and wherein the jumper is configured to be selectively electrically coupled to each of the first jumper terminal and a second jumper terminal of a second PDS panel insert of a second modular electrical signal supply assembly to transmit the electrical signal between the first PDS panel insert and the second PDS panel insert.

A5.1. The modular electrical signal supply assembly of any of paragraphs A-A4.9, wherein the floor panel further comprises a lower face sheet positioned underneath at least one of the core layer and the PDS panel insert.

A5.2. The modular electrical signal supply assembly of paragraph A5.1, wherein the core layer is positioned at least substantially between the lower face sheet and the upper face sheet.

A5.3. The modular electrical signal supply assembly of any of paragraphs A5.1-A5.2, wherein the PDS panel insert is positioned at least substantially between the lower face sheet and the upper face sheet.

A5.4. The modular electrical signal supply assembly of any of paragraphs A-A5.3, wherein the core layer comprises a honeycomb structure.

A5.5. The modular electrical signal supply assembly of any of paragraphs A-A5.4, wherein the core layer is constructed of at least one of a plastic, a polymer, an aramid polymer, a metal, aluminum, a composite material, and a fiberglass.

A5.6. The modular electrical signal supply assembly of any of paragraphs A-A.5, wherein the upper face sheet is constructed of at least one of a plastic, a polymer, an aramid polymer, a metal, aluminum, a composite material, and a fiberglass.

A5.7. The modular electrical signal supply assembly of any of paragraphs A5.1-A5.6, wherein the lower face sheet is constructed of at least one of a plastic, a polymer, an aramid polymer, a metal, aluminum, a composite material, and a fiberglass.

A5.8. The modular electrical signal supply assembly of any of paragraphs A-A5.7, wherein the core layer is integrally formed with at least one of the upper face sheet and a/the lower face sheet.

A5.9. The modular electrical signal supply assembly of any of paragraphs A-A5.8, wherein the core layer is coupled to at least one of the upper face sheet and a/the lower face sheet with an adhesive.

A5.10. The modular electrical signal supply assembly of any of paragraphs A-A5.9, wherein the core layer is coupled to at least one of the upper face sheet and a/the lower face sheet with a mechanical fastener.

A5.11. The modular electrical signal supply assembly of any of paragraphs A-A5.10, wherein the PDS panel insert is coupled to at least one of the core layer, the upper face sheet, and a/the lower face sheet with an adhesive.

A5.12. The modular electrical signal supply assembly of any of paragraphs A-A5.11, wherein the PDS panel insert is coupled to at least one of the core layer, the upper face sheet, and a/the lower face sheet with a mechanical fastener.

A5.13. The modular electrical signal supply assembly of any of paragraphs A-A5.12, wherein the PDS panel insert extends along at least one of at least 25%, at least 50%, at least 75%, at least 90%, at least 95%, and 100% of a length of the edge of the floor panel.

A5.14. The modular electrical signal supply assembly of any of paragraphs A-A5.13, wherein the PDS panel insert has a thickness that is at least substantially equal to a thickness of the core layer.

A5.15. The modular electrical signal supply assembly of any of paragraphs A-A5.14, wherein the PDS panel insert has a rigidity that is at least one of substantially equal to and greater than a rigidity of the core layer.

A5.16. The modular electrical signal supply assembly of any of paragraphs A-A5.15, wherein the floor panel is rectangular.

A5.17. The modular electrical signal supply assembly of paragraph A5.16, wherein the floor panel has at least one long edge and at least one short edge.

A5.18. The modular electrical signal supply assembly of paragraph A5.17, wherein the PDS panel insert is positioned along a long edge of the floor panel.

A5.19. The modular electrical signal supply assembly of any of paragraphs A5.17-A5.18, wherein the PDS panel insert is positioned along a short edge of the floor panel.

B. An electrical signal distribution system, comprising:
at least one modular electrical signal supply assembly of any of paragraphs A-A5.19; and
at least one electrical device electrically coupled to the PDS panel insert.

B1.1. The electrical signal distribution system of paragraph B, wherein the at least one modular electrical signal supply assembly comprises a plurality of modular electrical signal supply assemblies with a corresponding plurality of PDS panel inserts, and wherein each of the plurality of PDS panel inserts are electrically coupled to one another to form a signal supply chain configured to transmit the electrical signal between the plurality of PDS panel inserts.

B1.2. The electrical signal distribution system of paragraph B1.1, wherein each of the plurality of PDS panel inserts comprises a/the jumper terminal configured to transmit the electric signal to a separate PDS panel insert, and wherein the electrical signal distribution system further comprises at least one jumper configured to be selectively electrically coupled to each of at least two separate PDS panel inserts to form the signal supply chain.

B1.3. The electrical signal distribution system of any of paragraphs B1.1-B1.2, wherein the plurality of modular electrical signal supply assemblies are positioned such that the plurality of PDS panel inserts are at least substantially collinear.

B1.4. The electrical signal distribution system of any of paragraphs B-B1.3, wherein the at least one electrical device comprises a plurality of electrical devices electrically coupled to at least one PDS panel insert, optionally a plurality of PDS panel inserts, and further optionally a corresponding plurality of PDS panel inserts.

B1.5. The electrical signal distribution system of any of paragraphs B-B1.4, wherein the electrical signal distribution system further comprises an electrical signal source configured to provide the electrical signal to at least one PDS panel insert of the electrical signal distribution system.

B1.6. The electrical signal distribution system of any of paragraphs B-B1.5, wherein the electrical signal distribution system further comprises a master control unit in electrical communication with the at least one electrical device and configured to control the electrical signal that is provided to each of the at least one electrical device.

B2.1. The electrical signal distribution system of any of paragraphs B-B1.6, wherein the electrical device comprises at least one of a lighting assembly, a display, a video monitor, a sensor, an electrical power supply, a charging port, a USB charging port, a data port, a USB data port, an Ethernet port, and a wireless communication source.

B2.2. The electrical signal distribution system of any of paragraphs B-B2.1, wherein the electrical device comprises an/the electrical device input configured to form an electrical connection with the PDS panel insert.

B2.3. The electrical signal distribution system of paragraph B2.2, wherein the electrical device input comprises an/the input connector interface configured to be selectively electrically coupled to an output connector interface.

B2.4. The electrical signal distribution system of paragraph B2.3, wherein the input connector interface comprises at least one of a plug, a male plug, a female plug, a receptacle, a coaxial connector, a pin header, a header connector, an edge connector, an Ethernet connector, and a USB connector.

B3.1. The use of the electrical signal distribution system of any of paragraphs B-B2.4 on an aircraft.

C. A vehicle, comprising:
an interior cabin; and
the electrical signal distribution system of any of paragraphs B1-B2.4 positioned within the interior cabin.

C1.1. The vehicle of paragraph C, when dependent from paragraph B1.1, wherein the interior cabin comprises a cabin longitudinal axis, and wherein the plurality of PDS panel inserts are arranged at least substantially parallel to the cabin longitudinal axis.

C1.2. The vehicle of any of paragraphs C-C1.1, wherein the interior cabin comprises a/the cabin longitudinal axis, and wherein a/the long edge of each floor panel is at least substantially parallel to the cabin longitudinal axis.

C1.3. The vehicle of any of paragraphs C-C1.2, wherein the interior cabin comprises a/the cabin longitudinal axis, and wherein the plurality of PDS panel inserts are positioned at least substantially perpendicular to the cabin longitudinal axis.

C1.4. The vehicle of any of paragraphs C-C1.3, wherein the vehicle further comprises at least one passenger seat positioned within the interior cabin, and wherein the electrical device is associated with the at least one passenger seat.

C1.5. The vehicle of paragraph C1.4, when dependent from paragraph A2.2, wherein the interior cabin comprises the sub-floor surface structure, and wherein each of the at least one passenger seat is coupled to the sub-floor surface structure.

C1.6. The vehicle of any of paragraphs C1.4-C1.5, wherein the interior cabin comprises at least one aisle extending at least substantially parallel to a/the cabin longitudinal axis, wherein the aisle is configured to permit a passenger to access the at least one passenger seat.

C1.7. The vehicle of any of paragraphs C-C1.6, wherein each PDS panel insert is at least substantially concealed from view.

C1.8. The vehicle of any of paragraphs C-C1.7, wherein the vehicle is an aircraft configured to transport passengers.

C1.9. The vehicle of paragraph C1.8, wherein the aircraft comprises a fuselage that encloses the interior cabin.

C1.10. The use of the vehicle of any of paragraphs C-C1.9 to transport persons.

D. A method of assembling an interior cabin of a vehicle, the method comprising:
providing at least two modular electrical signal supply assemblies, each modular electrical signal supply assembly including:
a floor panel with an upper face sheet and a core layer positioned underneath the upper face sheet, wherein the core layer is configured to add rigidity to the floor panel; and
at least one power/data strip (PDS) panel insert positioned underneath the upper face sheet and along an edge of the floor panel, wherein the PDS panel insert is configured to provide an electrical signal to at least one electrical device positioned within the interior cabin;
positioning the at least two floor panels at a lower surface of the interior cabin to at least partially define a floor surface; and
electrically coupling each PDS panel insert to at least one other PDS panel insert to form a signal supply chain configured to transmit the electrical signal between the PDS panel inserts.

D1.1. The method of paragraph D, wherein the electrically coupling comprises electrically coupling at least one PDS panel insert to at least one other PDS panel insert with a jumper.

D1.2. The method of any of paragraphs D-D1.1, wherein the method further comprises electrically connecting the at least one electrical device to the signal supply chain.

D1.3. The method of paragraph D1.2, wherein the modular electrical signal supply assembly comprises at least one outlet configured to electrically couple the PDS panel insert to the electrical device; wherein the outlet comprises an outlet connector interface configured to be selectively electrically coupled to an input connector interface of the electrical device, and wherein the electrically connecting comprises electrically connecting the outlet connector interface and the input connector interface.

D1.4. The method of any of paragraphs D1.2-D1.3, wherein the vehicle comprises an electrical signal source configured to provide the electrical signal to at least one PDS panel insert, and wherein the method further comprises electrically coupling the electrical signal source to the signal supply chain.

D1.5. The method of any of paragraphs D-D1.4, wherein each modular electrical signal supply assembly is the modular electrical signal supply assembly of any of paragraphs A1-A5.19.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A modular electrical signal supply assembly for an interior cabin of a vehicle, the modular electrical signal supply assembly comprising:
a floor panel with an upper face sheet and a core layer positioned underneath the upper face sheet; wherein the core layer is configured to add rigidity to the floor panel; and
at least one power/data strip (PDS) panel insert positioned underneath the upper face sheet and along an edge of the floor panel;
wherein the at least one PDS panel insert is configured to provide an electrical signal to at least one electrical device positioned within the interior cabin;
wherein the floor panel is configured to be coupled to a sub-floor surface structure within the interior cabin; wherein the sub-floor surface structure comprises a plurality of sub-floor surface structure mounting holes positioned along a length of the sub-floor surface structure; wherein the floor panel comprises a plurality of floor panel mounting holes configured to align with the plurality of sub-floor surface structure mounting holes; wherein the floor panel is configured to be coupled to the sub-floor surface structure by a plurality of mechanical fasteners extending through the plurality of floor panel mounting holes and the plurality of sub-floor surface structure mounting holes; and wherein the at least one PDS panel insert at least partially defines the plurality of floor panel mounting holes.

2. The modular electrical signal supply assembly of claim 1, wherein the electrical signal comprises at least one of an electrical power signal, a data signal, and an electrical ground.

3. The modular electrical signal supply assembly of claim 1, wherein the sub-floor surface structure comprises a seat track configured to retain at least one passenger seat in position within the interior cabin.

4. The modular electrical signal supply assembly of claim 1, wherein the modular electrical signal supply assembly further comprises at least one outlet configured to electrically couple the at least one PDS panel insert to the electrical device.

5. The modular electrical signal supply assembly of claim 4, wherein the at least one outlet comprises an outlet connector interface configured to be selectively electrically coupled to an input connector interface of the electrical device.

6. The modular electrical signal supply assembly of claim 4, wherein the at least one outlet comprises an outlet cord extending from the at least one PDS panel insert.

7. The modular electrical signal supply assembly of claim 6, wherein the outlet cord is hard-wired to the at least one PDS panel insert.

8. The modular electrical signal supply assembly of claim 4, wherein the at least one outlet comprises a plurality of outlets distributed along the at least one PDS panel insert and separated by an outlet spacing; and wherein the outlet spacing is at least 40 centimeters (cm).

9. The modular electrical signal supply assembly of claim 8, wherein the outlet spacing is configured to correspond to a seat pitch of a plurality of passenger seats.

10. The modular electrical signal supply assembly of claim 1, wherein the at least one PDS panel insert comprises a printed circuit board (PCB).

11. The modular electrical signal supply assembly of claim 10, wherein the PCB is a potted PCB that is at least partially encased in at least one of a resin, a thermosetting plastic, a polymer, polyurethane, silicone, and rubber.

12. The modular electrical signal supply assembly of claim 1, wherein the at least one PDS panel insert has a thickness that is equal to a thickness of the core layer.

13. The modular electrical signal supply assembly of claim 1, wherein the floor panel further comprises a lower face sheet positioned underneath at least one of the core layer and the at least one PDS panel insert, and wherein the at least one PDS panel insert is positioned between the lower face sheet and the upper face sheet.

14. The modular electrical signal supply assembly of claim 1, wherein the at least one PDS panel insert extends along at least 75% of a length of the edge of the floor panel.

15. An electrical signal distribution system, comprising:
at least one modular electrical signal supply assembly of claim 1; and
at least one electrical device electrically coupled to the at least one PDS panel insert;
wherein the at least one modular electrical signal supply assembly comprises a plurality of modular electrical signal supply assemblies with a corresponding plurality of PDS panel inserts, and wherein each of the plurality of PDS panel inserts are electrically coupled to one another to form a signal supply chain configured to transmit the electrical signal between the plurality of PDS panel inserts.

16. A vehicle, comprising:
an interior cabin; and
an electrical signal distribution system positioned within the interior cabin;
wherein the interior cabin comprises:
at least one sub-floor surface structure configured to retain at least one passenger seat in position within the interior cabin; and
at least one aisle extending parallel to a cabin longitudinal axis, wherein the aisle is configured to permit a passenger to access the at least one passenger seat;
wherein the electrical signal distribution system comprises:
a plurality of modular electrical signal supply assemblies; and
a plurality of electrical devices;
wherein each modular electrical signal supply assembly comprises:
a floor panel with an upper face sheet, a lower face sheet, and a core layer positioned between the upper face sheet and the lower face sheet, wherein the core layer is configured to add rigidity to the floor panel; and
at least one power/data strip (PDS) panel insert positioned between the upper face sheet and the lower face sheet and along an edge of the floor panel;
wherein each PDS panel insert of the at least one PDS panel insert is configured to provide an electrical signal to at least one of the plurality of electrical devices; wherein each PDS panel insert of the at least one PDS panel insert is selectively electrically coupled to at least one other PDS panel insert by a jumper configured to transmit the electrical signal; and wherein each modular electrical signal supply assembly is mounted to the at least one sub-floor surface structure.

17. A method of assembling an interior cabin of a vehicle, the method comprising:
providing at least two modular electrical signal supply assemblies, each modular electrical signal supply assembly including:
a floor panel with an upper face sheet and a core layer positioned underneath the upper face sheet, wherein the core layer is configured to add rigidity to the floor panel; and
at least one power/data strip (PDS) panel insert positioned underneath the upper face sheet and along an edge of the floor panel, wherein the at least one PDS panel insert is configured to provide an electrical signal to at least one electrical device positioned within the interior cabin;
wherein the floor panel is configured to be coupled to a sub-floor surface structure within the interior cabin; wherein the sub-floor surface structure comprises a plurality of sub-floor surface structure mounting holes positioned along a length of the sub-floor surface structure; wherein the floor panel comprises a plurality of floor panel mounting holes configured to align with the plurality of sub-floor surface structure mounting holes; wherein the floor panel is configured to be coupled to the sub-floor surface structure by a plurality of mechanical fasteners extending through the plurality of floor panel mounting holes and the plurality of sub-floor surface structure mounting holes; and wherein the at least one PDS panel insert at least partially defines the plurality of floor panel mounting holes;

positioning the floor panels of the at least two modular electrical signal supply assemblies at a lower surface of the interior cabin to at least partially define a floor surface; and electrically coupling each PDS panel insert of the at least one PDS panel insert to at least one other PDS panel insert to form a signal supply chain configured to transmit the electrical signal between the PDS panel inserts.

18. The modular electrical signal supply assembly of claim 1, wherein the at least one PDS panel insert comprises at least two PDS panel inserts; wherein each PDS panel insert of the at least two PDS panel inserts comprises a jumper terminal configured to transmit the electrical signal to a separate PDS panel insert of the at least two PDS panel inserts; and wherein the modular electrical signal supply assembly further comprises a jumper configured to be selectively electrically coupled to the jumper terminals of each of the at least two PDS panel inserts.

19. The modular electrical signal supply assembly of claim 6, wherein the outlet cord is configured to be selectively electrically coupled to the at least one PDS panel insert.

20. A vehicle, comprising:
an interior cabin; and
the electrical signal distribution system of claim 15 positioned within the interior cabin.

\* \* \* \* \*